(12) United States Patent
Maruyama

(10) Patent No.: US 7,856,006 B2
(45) Date of Patent: Dec. 21, 2010

(54) MOBILE COMMUNICATION APPARATUS, MOBILE COMMUNICATION SYSTEM, AND POWER CONSUMPTION REDUCING METHOD FOR USE THEREWITH

(75) Inventor: Hidenori Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 597 days.

(21) Appl. No.: 11/871,050

(22) Filed: Oct. 11, 2007

(65) Prior Publication Data

US 2008/0117868 A1     May 22, 2008

(30) Foreign Application Priority Data

Nov. 22, 2006    (JP)    ............... 2006-314943

(51) Int. Cl.
*H04J 1/00*     (2006.01)
(52) U.S. Cl. ........................ 370/343; 370/480
(58) Field of Classification Search ................. 370/208, 370/343, 480; 375/260
See application file for complete search history.

(56) References Cited

U.S. PATENT DOCUMENTS 6,813,239 B2 * 11/2004 Atsuta ......................... 370/217
2007/0201350 A1 * 8/2007 Papasakellariou ........... 370/208

FOREIGN PATENT DOCUMENTS

KR     2003052227 A     6/2003

OTHER PUBLICATIONS

"Physical layer aspects for evolved Universal Terrestrial Radio Access (UTRA) (Release 7)", 3GPP TR 25.814 V.7.1.0 Sep. 2006, pp. 71-93.
Korean Office Action for KR 10-2007-0119643 issued Sep. 30, 2009.

* cited by examiner

*Primary Examiner*—Ricky Ngo
*Assistant Examiner*—Chandrahas Patel

(57) ABSTRACT

A mobile communication apparatus including a transmission portion which transmits data after varying an amount of data to be transmitted under control of scheduling from at least a base station, including a schedule portion that stops an operation of an unnecessary circuit by controlling an operation rate of the transmission portion.

9 Claims, 4 Drawing Sheets

LOCALIZED MAPPING

DISTRIBUTED MAPPING

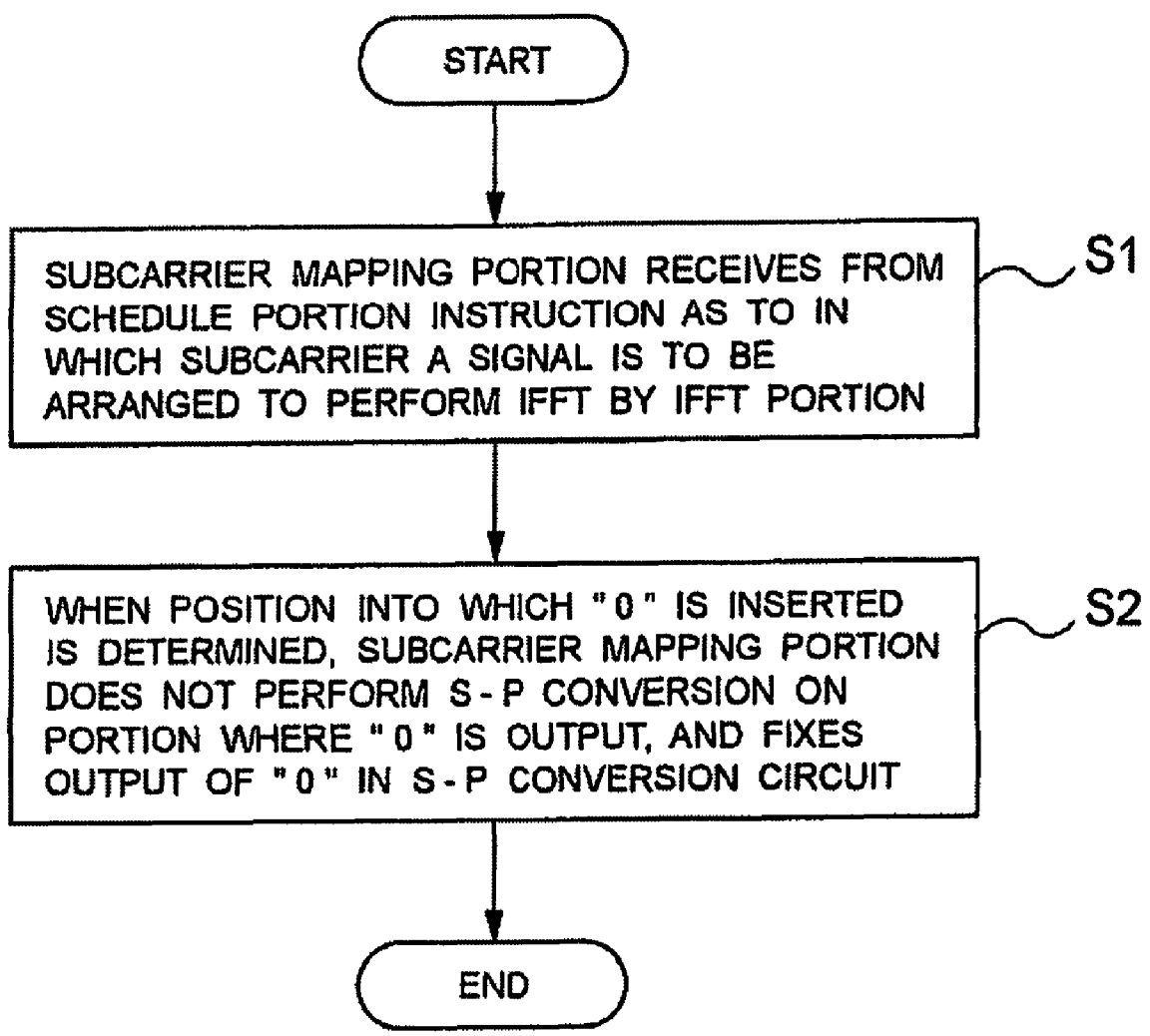

MOBILE COMMUNICATION APPARATUS, MOBILE COMMUNICATION SYSTEM, AND POWER CONSUMPTION REDUCING METHOD FOR USE THEREWITH

INCORPORATION BY REFERENCE

This application is based upon and claims the benefit of priority from Japanese patent applications No. 2006-314943, filed on Nov. 22, 2006, the disclosure of which is incorporated herein its entirety by reference.

BACKGROUND OF THE INVENTION

1. Field of the Invention

The present invention relates to a mobile communication apparatus, a mobile communication system, and a power consumption reducing method for use with the apparatus and the system, and more specifically to a mobile communication system using an SC-FDMA (single carrier-frequency division multiple access) system in a 3GPP (3rd generation partnership project).

2. Description of the Related Art

At present, a mobile communication system using the SC-FDMA system is investigated as a communication system after the third generation mobile communication system (for example, refer to the Non-Patent Document 1 "Physical layer aspects for evolved Universal Terrestrial Radio Access (UTRA) 9 UL. Concepts" [3GPP TR25.814 V7.1.0 (2006-09), pp 71-93]).

In the next generation communication system, one of the objects is that a large volume of data can be communicated on a terminal transmission side at a high speed by scheduling from a base station, and it is anticipated that the circuit might be complicated and required high-speed. As the high-speed data communication becomes available, applications to be loaded onto an upper layer should be graded up and complicated, and therefore increase of power consumption is anticipated.

With the above-mentioned related mobile communication system, a high-speed complicated circuit and a high-level complicated application are anticipated with increasing power consumption. Therefore, reduction on the power consumption is further demanded especially for a terminal driven by a battery. In addition, a power-saving terminal is an essential item in light of the recent global environmental problems.

SUMMARY

An exemplary object of the invention is to solve the above-mentioned problem, and provide a mobile communication apparatus, a mobile communication system and a power consumption reducing method for use with the apparatus and the system which are capable of controlling the operation rate of a subcarrier mapping portion and reducing the power consumption of a terminal.

An exemplary aspect of the invention is a mobile communication apparatus including a transmission portion which transmits data after varying the amount of data to be transmitted under control of scheduling from at least a base station, and includes a schedule portion that stops the operation of an unnecessary circuit by controlling the operation rate of the transmission portion.

An exemplary aspect of the invention is a mobile communication system that includes the above-mentioned mobile communication apparatus.

An exemplary aspect of the invention is a power consumption reducing method for use with a mobile communication apparatus including a transmission portion which transmits data after varying the amount of data to be transmitted under control of scheduling from at least a base station, and includes scheduling of stopping an operation of an unnecessary circuit by controlling the operation rate of the transmission portion of the mobile communication apparatus.

BRIEF DESCRIPTION OF THE DRAWINGS

FIG. 3 is a flowchart showing an example of an operation of the power consumption reducing method according to the first exemplary embodiment of the invention;

EXEMPLARY EMBODIMENT

In the mobile communication apparatus according to the present invention, the transmission and reception conditions, the requested amount of transmission data, etc. of the mobile communication system using the SC-FDMA (single carrier-frequency division multiple access) system in the 3GPP (3rd generation partnership project) are scheduled on the base station side. Thus, the power consumption of the apparatus can be reduced by controlling the operation of the transmission portion in the mobile communication system in which the frequency band width used by the apparatus is variable.

In the next generation communication system proposed by the 3GPP, a mobile communication system can transmit data after varying the amount of data to be transmitted under the control by scheduling etc. from a base station.

To be more specific, in the mobile communication apparatus according to the present invention, when an instruction is received from the schedule portion as to in which subcarrier a signal is arranged to perform the IFFT by the IFFT (inverse fast Fourier transform) portion, the subcarrier mapping portion arranges the signal output from the DFT (discrete Fourier transform) portion in a position of the specified subcarrier.

When the position into which "0" is to be inserted by an instruction from the schedule portion is determined, the subcarrier mapping portion does not perform the S-P converting operation on the portion at which "0" is output in the S-P (serial-parallel) conversion circuit, but fixes the output of "0". Thus, the data "0" is input for the portion where no signal is received from the subcarrier mapping portion at the input terminal of the IFFT portion.

Therefore, the mobile communication apparatus according to the present invention controls the operation rate of the subcarrier mapping portion on the terminal transmission side based on the information about the scheduling etc., and stops the operation of an unnecessary circuit (disconnection of the power to a component, disconnection of the supply of the clock etc.), thereby reducing the power consumption of the circuit.

That is, the mobile communication apparatus according to the present invention lowers the operation rate of the circuit on the terminal transmission side in the next generation communication system using an SC-FDMA system considered as a next generation mobile communication system, thereby successfully reducing the power consumption.

Figure 1:
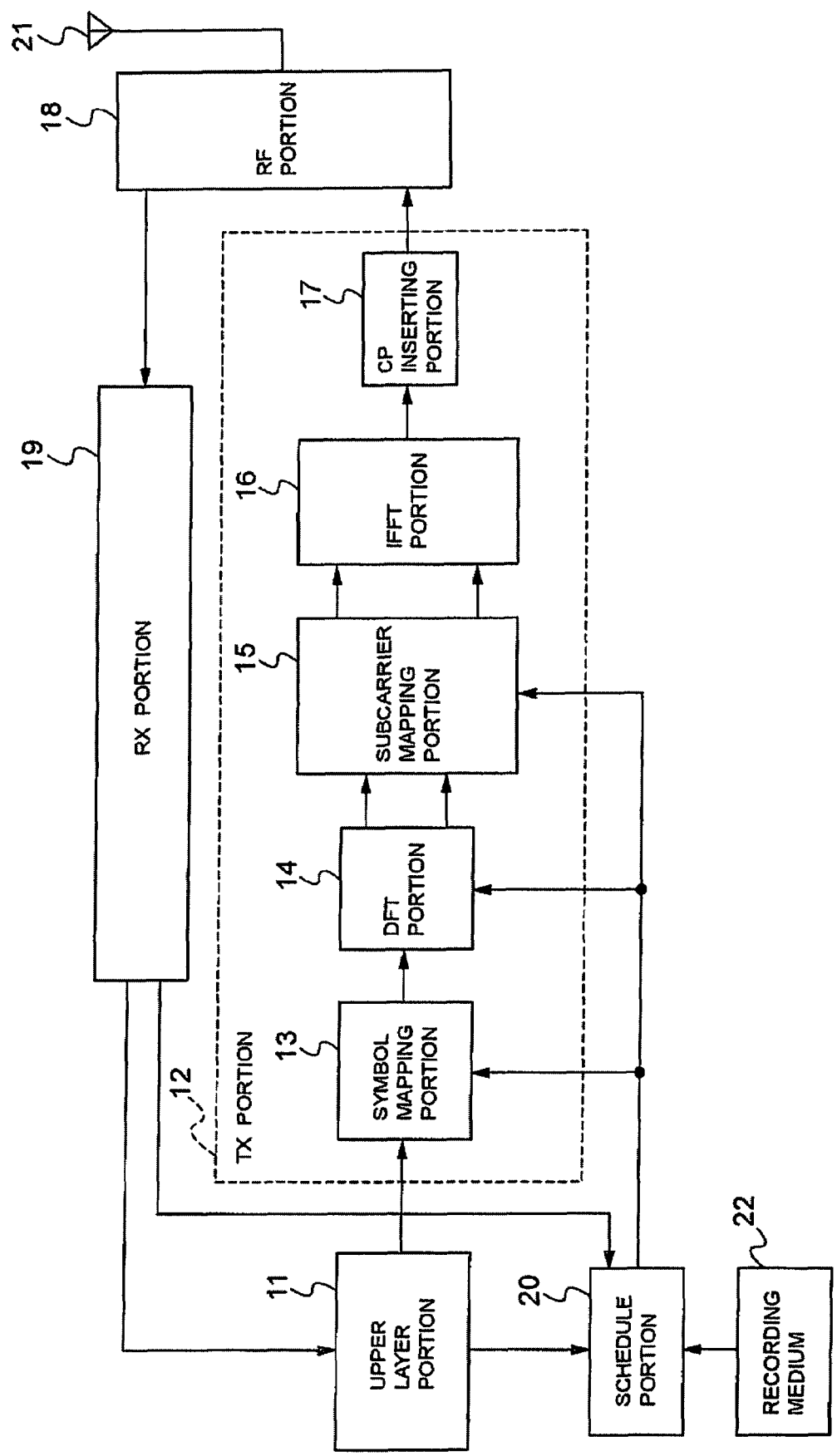
FIG. 1 is a block diagram showing the configuration of the mobile communication apparatus according to the first exemplary embodiment of the invention.

Next, an exemplary embodiment of the invention will be described with reference to the drawings. FIG. 1 is a block diagram of the configuration of the mobile communication apparatus according to the first exemplary embodiment of the invention. In FIG. 1, the mobile communication apparatus according to the first exemplary embodiment of the invention includes an upper layer portion 11, a TX portion (transmission portion) 12, an RF portion (radio portion) 18, an RX portion (reception portion) 19, a schedule portion 20, an antenna 21, and a recording medium 22.

The TX portion 12 includes a symbol mapping portion 13, a DFT (discrete Fourier transform) portion 14, a subcarrier mapping portion 15, an IFFT (inverse fast Fourier transform) portion 16, and a CP (cyclic prefix) inserting portion 17.

The symbol mapping portion 13 codes and modulates a signal from the upper layer portion 11 or a control signal. The DFT portion 14 performs a DFT process on the signal coded and modulated by the symbol mapping portion 13 to convert it into a signal of a frequency area.

The subcarrier mapping portion 15 performs a subcarrier mapping process on the signal converted into the signal of the frequency area by the DFT portion 14. The IFFT portion 16 performs the IFFT, and the CP inserting portion 17 inserts a CP. The signal into which the CP is inserted by the CP inserting portion 17 is high-frequency amplified by the RF portion 18, and transmitted as radio waves from the antenna 21.

On the other hand, the radio waves received by the antenna 21 are detected and demodulated by the RX portion 19 through the RF portion 18. The RX portion 19 delivers the detected and demodulated data and the control signal to the upper layer portion 11, and notifies the schedule portion 20 of the reception quality, the control signal, etc. The schedule portion 20 acquires the signal type information including the priority level based on the information of the amount of data of the transmission signal from the upper layer portion 11 or the uplink control information received from the RX portion 19, determines a transmission pattern, and notifies the symbol mapping portion 13, the DFT portion 14, and the subcarrier mapping portion 15 of the determination result.

The recording medium 22 stores a program for the power consumption reducing method described later and shown by the flowchart in FIG. 3. The schedule portion 20 reads the program from the recording medium 22, and controls the symbol mapping portion 13, the DFT portion 14, and the subcarrier mapping portion 15 on the basis of the program.

Figure 2A:
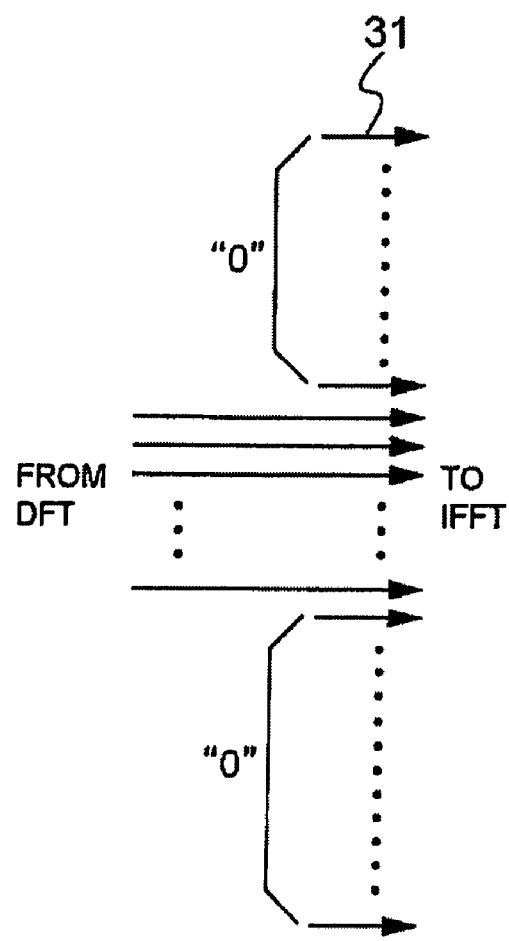
FIGS. 2A and 2B show an example of arranging a subcarrier according to the first exemplary embodiment of the invention.
Figure 2B:
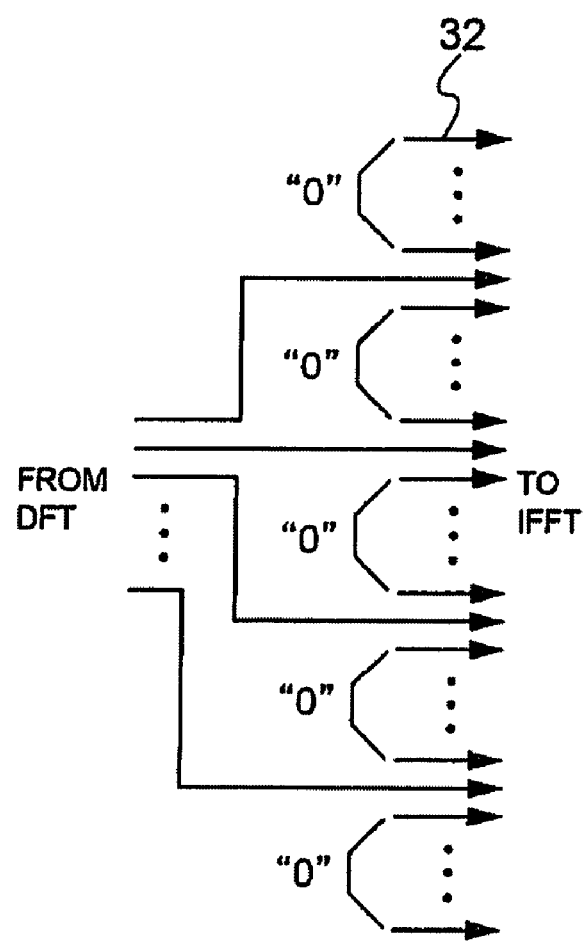

FIGS. 2A and 2B show examples of arranging a subcarrier according to the first exemplary embodiment of the invention. FIG. 3 is a flowchart showing an example of an operation of the power consumption reducing method according to the first exemplary embodiment of the invention. The mobile communication apparatus according to the first exemplary embodiment of the invention is described below with reference to FIGS. 1, 2A, 2B, and 3.

When the subcarrier mapping portion 15 receives an instruction from the schedule portion 20 as to in which subcarrier a signal is to be arranged to perform the IFFT by the IFFT portion 16 (step S1 in FIG. 3), the subcarrier mapping portion 15 arranges the signal output from the DFT portion 14 in the position of the specified subcarrier.

For example, in the 3GPP, localized mapping 31 shown in FIG. 2A and distributed mapping 32 shown in FIG. 2B are proposed.

The localized mapping 31 is a method of arranging subcarriers with concentration in all subcarriers. The distributed mapping 32 is a method of arranging the subcarriers distributed at predetermined intervals. It is assumed that "0" is inserted into the position of a subcarrier where no arrangement is made.

Thus, when the position into which "0" is to be inserted is determined by the instruction from the schedule portion 20, the subcarrier mapping portion 15 performs no S-P converting operation on the portion at which "0" is output and fixes the output of "0" in the S-P (serial-parallel) conversion circuit not shown in the attached drawings (step S2 shown in FIG. 3). Thus, "0" data is to be input at the input terminal of the IFFT portion 16 for the portion where no signal is received from the subcarrier mapping portion 15.

According to the first exemplary advantage according to the invention, the operation rate of the subcarrier mapping portion can be controlled by assigning a transmission pattern, thereby reducing the power consumption of the mobile communication apparatus.

Figure 4:
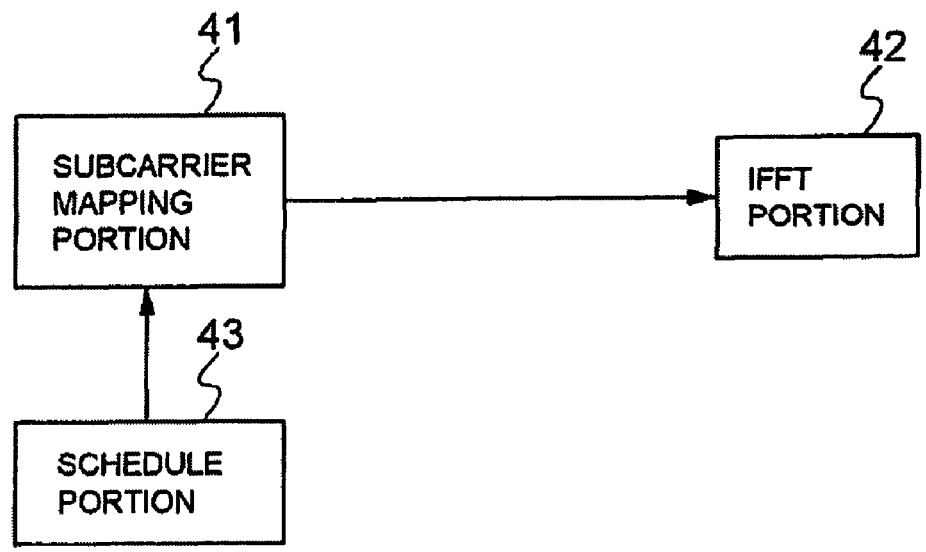
FIG. 4 shows an example of transmitting a subcarrier signal according to the second exemplary embodiment of the invention.
Figure 5A:
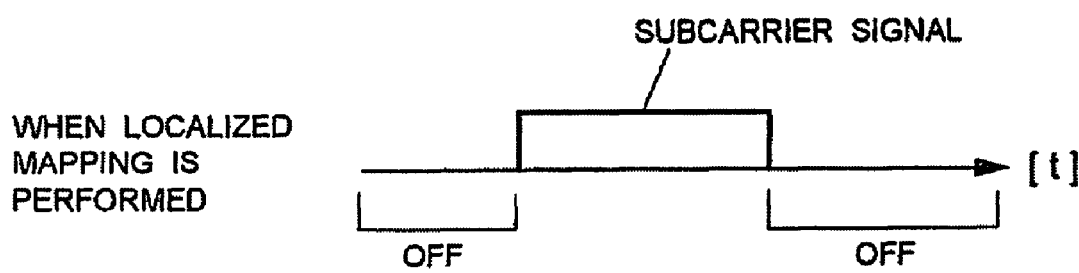
FIG. 5A shows an example of transmitting a subcarrier signal when performing localized mapping.
Figure 5B:
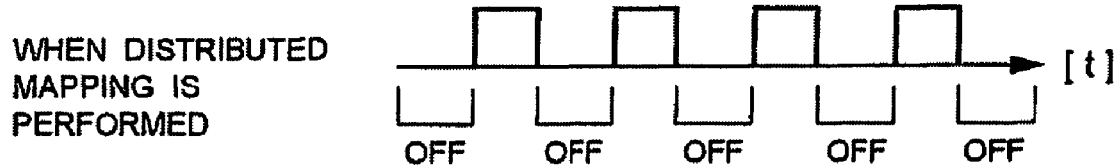
FIG. 5B shows an example of transmitting a subcarrier signal when performing distributed mapping.

FIG. 4 shows the configuration of the mobile communication apparatus according to the second exemplary embodiment of the invention. FIG. 5A shows an example of transmitting a subcarrier signal when the localized mapping operation is performed, and FIG. 5B shows an example of transmitting a subcarrier signal when the distributed mapping operation is performed.

In the mobile communication apparatus according to the second exemplary embodiment of the invention, if signal processing is serially performed, a subcarrier mapping portion 41 performs the subcarrier mapping on the signal after the DFT process, the signal is input to an IFFT portion 42, and a schedule portion 43 inputs information as to in which subcarrier the signal is to be arranged, then the subcarrier mapping portion 41 has the time period in which "0", is inserted while it serially transmits a subcarrier signal.

According to the second exemplary advantage according to the invention, the subcarrier mapping portion 41 can reduce the operation rate of the circuit by stopping the operation of an unnecessary circuit at that time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication apparatus including a transmission portion which transmits data after varying an amount of data to be transmitted under control of scheduling from at least a base station, comprising:

a schedule portion that stops an operation of an unnecessary circuit by controlling an operation rate of the transmission portion;

wherein the transmission portion comprises:

a DFT circuit that performs a DFT (discrete Fourier transform) process on an input signal, thereby converting the signal into a signal of a frequency area;

a subcarrier mapping circuit that performs subcarrier mapping on the signal converted into a signal of a frequency area by the DFT circuit; and an IFFT circuit that performs IFFT (inverse fast Fourier transform) on the signal subcarrier mapped by the subcarrier mapping circuit; and the schedule portion stops the operation of the unnecessary circuit by controlling the operation rate of the subcarrier mapping circuit.

2. A mobile communication system, comprising the mobile communication apparatus according to claim 1.

3. The mobile communication apparatus according to claim 2, wherein when the subcarrier mapping circuit receives from the schedule portion an instruction to perform the IFFT by the IFFT circuit in which subcarrier a signal is to be arranged, the subcarrier mapping circuit fixes output of "0" without performing a serial-parallel converting operation about a position into which "0" is inserted when the signal output from the DFT circuit is arranged in a position of a specified subcarrier.

4. The mobile communication apparatus according to claim 1, wherein an SC-FDMA (single carrier-frequency division multiple access) system is used.

5. The mobile communication apparatus according to claim 4, wherein the subcarrier mapping circuit performs the subcarrier mapping by one of localized mapping for arranging the subcarriers with concentration in all subcarriers and distributed mapping for distributing and arranging the subcarriers at predetermined intervals.

6. A power consumption reducing method for use with a mobile communication apparatus including a transmission portion which transmits data after varying an amount of data to be transmitted under control of scheduling from at least a base station, comprising:

scheduling of stopping an operation of an unnecessary circuit by controlling an operation rate of the transmission portion of the mobile communication apparatus, wherein the transmission portion comprises:

a DFT circuit that performs a DFT (discrete Fourier transform) process on an input signal, thereby converting the signal into a signal of a frequency area;

a subcarrier mapping circuit that performs subcarrier mapping on the signal converted into a signal of a frequency area by the DFT circuit; and an IFFT circuit that performs IFFT (inverse fast Fourier transform) on the signal subcarrier mapped by the subcarrier mapping circuit; and the scheduling stops the operation of the unnecessary circuit by controlling the operation rate of the subcarrier mapping circuit.

7. The power consumption reducing method according to claim 6, wherein an SC-FDMA (single carrier-frequency division multiple access) system is used in the mobile communication apparatus.

8. The power consumption reducing method according to claim 7, wherein the subcarrier mapping circuit performs the subcarrier mapping by one of localized mapping for arranging the subcarriers with concentration in all subcarriers and distributed mapping for distributing and arranging the subcarriers at predetermined intervals.

9. The power consumption reducing method according to claim 6, wherein when the subcarrier mapping circuit receives in the scheduling process an instruction to perform the IFFT by the IFFT circuit in which subcarrier a signal is to be arranged, the subcarrier mapping circuit fixes output of "0" without performing a serial-parallel converting operation about a position into which "0" is inserted when the signal output from the DFT circuit is arranged in a position of a specified subcarrier.

* * * * *